(No Model.)
C. DEVOY.
MEAT BROILER.
No. 565,107. Patented Aug. 4, 1896.
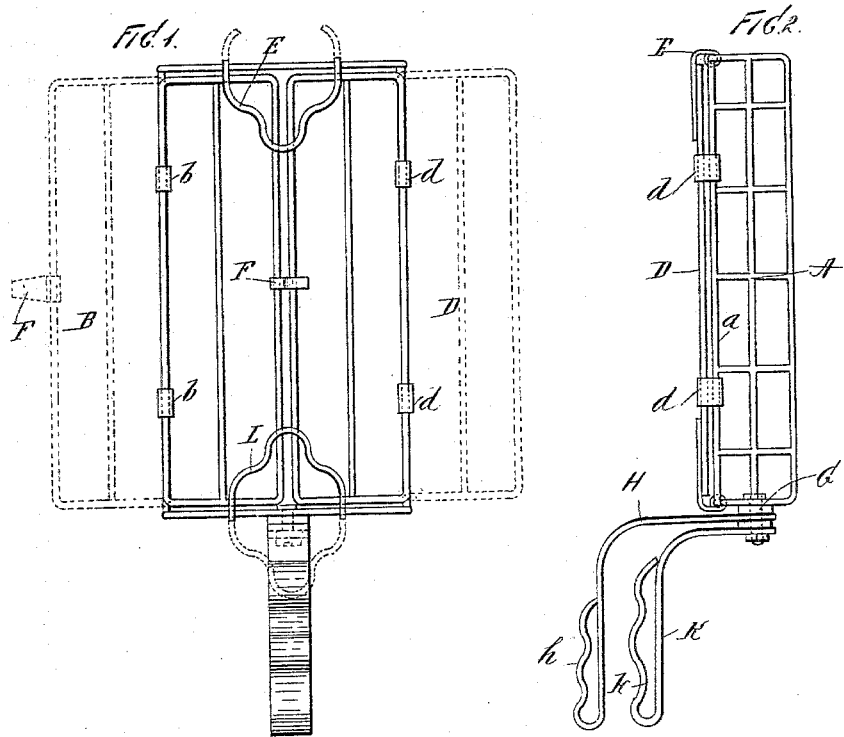
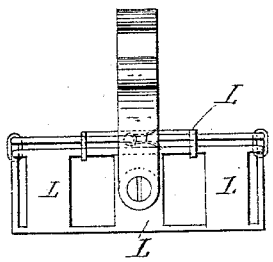
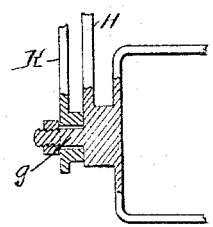
WITNESSES:
John Buckler,
C. Gerst.
INVENTOR
Catherine Devoy
BY
Edgar Tate & Co
ATTORNEYS.

UNITED STATES PATENT OFFICE.

CATHERINE DEVOY, OF NEW YORK, N. Y.

MEAT-BROILER.

SPECIFICATION forming part of Letters Patent No. 565,107, dated August 4, 1896.

Application filed December 7, 1895. Serial No. 571,326. (No model.)

*To all whom it may concern:*

Be it known that I, CATHERINE DEVOY, a citizen of the United States, and a resident of New York city, in the county of New York and State of New York, have invented certain new and useful Improvements in Meat-Broilers, of which the following is a specification, reference being had to the accompanying drawings, forming a part thereof, in which similar letters of reference indicate corresponding parts.

My invention relates to devices for use in broiling meats, such as steaks, chops, and the like; and the object thereof is to provide an effective device of this class which is simple in construction and operation, and perfectly adapted to accomplish in an effective manner the object for which it is intended.

The invention is fully disclosed in the following specification, of which the accompanying drawings form a part, in which—

Figure 1 is a plan view of my improved broiler, showing the lids or covers thereof in full and dotted lines; Fig. 2, a side view thereof; Fig. 3, an end view, and Fig. 4 a sectional detail of the construction.

In the practice of my invention I employ a cage or frame A, which is preferably oblong and rectangular in form, and comprises a bottom, sides, and ends which are composed of wire, and the cage or frame A is provided with two covers or lids B and D, one of which is hinged to the upper side wires $a$ at each side thereof, as shown at $b$ and $d$.

At one end of the cage or frame A, and midway of the upper portion thereof, is a hinged pivotal or otherwise secured wire or spring catch E, which is adapted to be folded over the ends of the covers or lids B and D, and to hold them in the closed position, as shown in Fig. 1, and one of said covers or lids is also provided with a spring-catch F, which is connected with one of the wires or rods of which said lid or cover is composed, and adapted to operate in connection with one of the wires or rods of the other, as shown in Fig. 1, to hold said lids or covers in the closed position.

Secured centrally to the cage or frame A, opposite the catch E, is a tubular head G, through which passes, or in connection with which is formed a shank $g$, the inner portion of which is square or angular in form, and has mounted thereon an operative handle H, and the outer portion of which is round or cylindrical in form, and has mounted thereon another handle or holder K, and secured to the end of the cage or frame A, adjacent to the handles H and K, is a hinged catch L, similar to the catch E, and intended for a similar purpose, said catch L being also adapted to be folded forward over the lids or covers B and D, so as to assist in holding them in place or to be folded backward in order that said covers may be opened, as shown in dotted lines in Fig. 1.

The handles or arms H and K are preferably crank-shaped or angular in form, and the outer ends thereof are bent backwardly, as shown at $h$ and $k$, respectively, and said portions are also corrugated, as clearly shown in Figs. 1 and 2, the object being to provide better handles than would be otherwise formed from sheet or similar metal, which is usually employed for this purpose.

The operation will be readily understood from the foregoing description, when taken in connection with the accompanying drawings.

The meat to be broiled is placed within the cage or frame A and the lids B and D are closed thereover and the broiler is held adjacent to or in contact with the source of heat by the handle K, and said broiler may be turned by the arm or handle H, as will be readily understood, in such manner as to expose all portions of the meat to the influence of the heat, by which means the process of broiling may be quickly and thoroughly performed.

It is evident that the handle or arm H may be held stationary and the cage or frame A revolved by the handle K, all that is necessary in order to produce this result being to form that part of the shank $g$, on which the handle K is mounted, angular or square in form and that portion on which the handle or arm H is mounted cylindrical in form, and this form of construction will probably be preferred to that hereinbefore described for the reason that the handle K, being inside of the handle or arm H, may be more easily turned than the latter.

I thus accomplish the object of my invention by means of a device which is simple in construction and operation and perfectly adapted to accomplish the result for which it is intended.

My invention is not limited to the exact form of the cage or frame A, nor to the construction thereof of wire, and strips of sheet metal may be employed for that purpose, if desired, and in the form of construction shown in Fig. 3 the end of the wire or cage is so constructed, strips or plates of sheet metal being shown at L, and it is evident that other changes in and modifications of the construction herein described may be made without departing from the spirit of my invention.

Having fully described my invention, its construction and operation, I claim as new and desire to secure by Letters Patent—

1. A meat-broiler, consisting of a wire frame, which is provided with hinged lids or covers, and which is also provided at one end with a shank or shaft, to which is secured a handle or arm, which is revoluble thereon, and another handle or arm which is rigidly connected therewith, whereby said frame or cage may be revolved by one of said handles or arms, while being held by the other, substantially as shown and described.

2. A meat-broiler, consisting of a wire frame or cage, which is provided at one end with a shank or shaft, to which is secured a handle or arm which is revoluble thereon, and another handle or arm which is rigidly connected therewith, whereby said frame or cage may be revolved by one of said handles or arms, while being held by the other, substantially as shown and described.

In testimony that I claim the foregoing as my invention I have signed my name, in presence of the subscribing witnesses, this 5th day of December, 1895.

CATHERINE DEVOY.

Witnesses:
C. GERST,
S. L. HAWKSHURST.